Jan. 22, 1935.  A. F. GARDNER  1,988,652
OIL SEAL
Filed Jan. 7, 1933
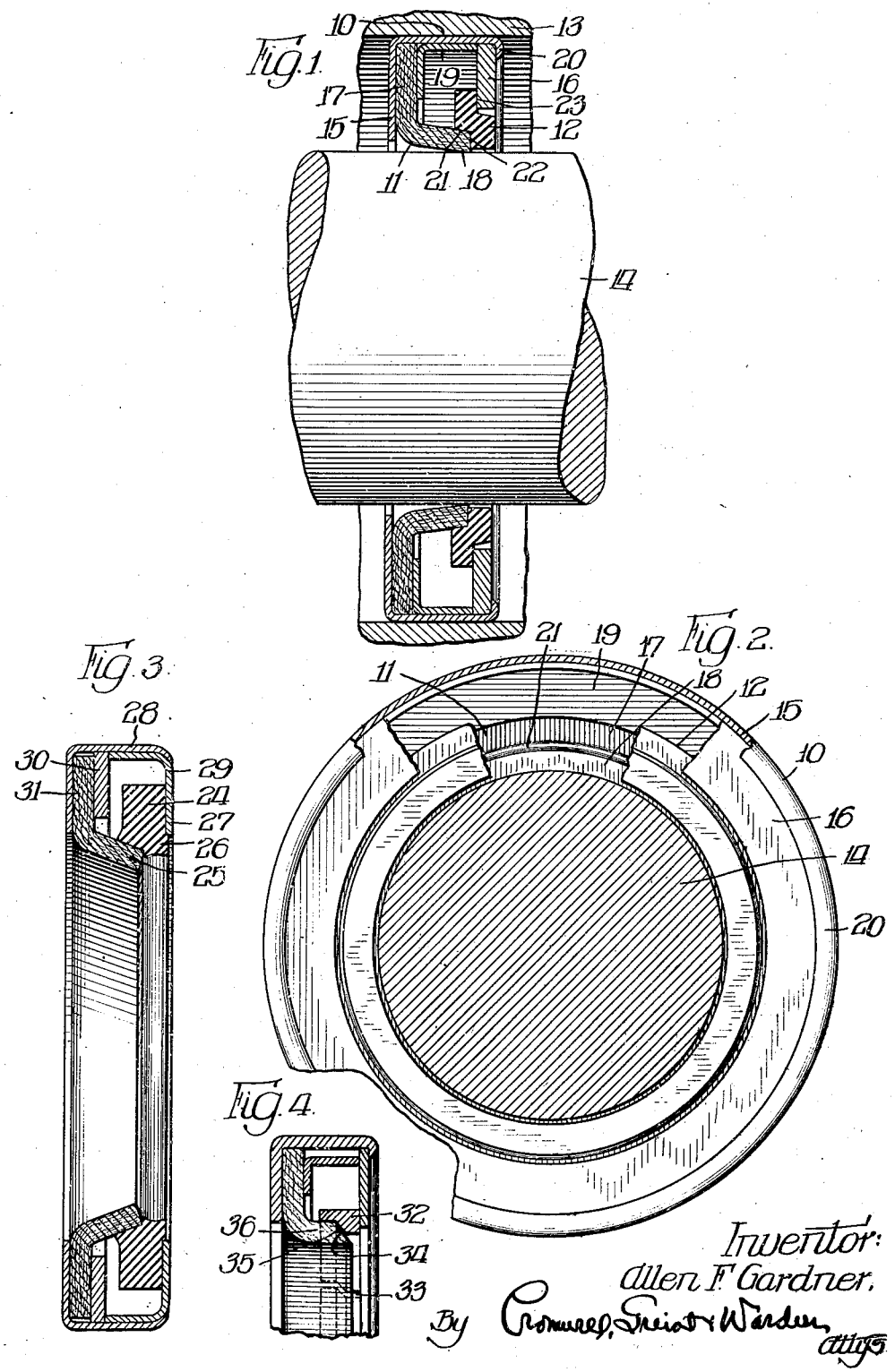
Inventor:
Allen F. Gardner.

Patented Jan. 22, 1935

1,988,652

UNITED STATES PATENT OFFICE 1,988,652

OIL SEAL

Allen F. Gardner, Detroit, Mich., assignor to Chicago Rawhide Manufacturing Company, Chicago, Ill., a corporation of Illinois Application January 7, 1933, Serial No. 650,609

3 Claims. (Cl. 288—1)

This invention relates to oil seals of the self-contained type.

One object of the invention is to provide an improved seal of the type described in which a solid band of rubber or other suitable material is loosely contained within the casing of the seal under tension for constricting the axially extending portion of the flanged packing.

Another object of the invention is to provide, in such a seal, a constricting band which is smaller than the chamber in which positioned and yet is so arranged with respect to the other parts of the seal to effectively close off the chamber.

Still another object is to provide a seal in which the pressure member which surrounds the axially extending portion of the packing also engages with the end of the axially extending portion.

Other more specific objects and advantages of the invention will be apparent to those skilled in the art upon a full understanding of the construction, arrangement and operation of the parts which are combined to form the improved seal.

In order that the invention may be readily understood, two structurally different embodiments of the same are presented herein, but it will of course be appreciated that such embodiments are intended primarily for the purpose of exemplification and that the invention is susceptible of being embodied in other structurally modified forms coming equally within the scope of the appended claims.

In the accompanying drawing:

Fig. 1 is a diametric section through the improved seal, showing the same in position on a shaft in a housing;

Fig. 2 is a face view of the seal, with portions broken away to disclose the inside construction;

Fig. 3 is a diametric section through a slightly different seal which embodies another form of the invention; and Fig. 4 is a radial section through a seal, illustrating still another embodiment of the invention.

The seal which is shown in Figs. 1 and 2 includes a hollow inwardly opening annular sheet metal casing 10, a centrally apertured sheet leather packing 11 and a small elastic band 12 which is preferably made of oil-impervious but elastic rubber. The casing 10, which is adapted to be positioned with a pressed fit in a cylindrical housing 13 about a centrally arranged shaft 14, is composed of a centrally apertured cup 15 and a washer 16. The packing 11 is arranged with the radially extending portion 17 of the same in flat outspread engagement with the bottom of the cup 15 and with the axially extending portion 18 in rotatable but snugly sealing engagement with the shaft 14. The radially extending portion 17 of the packing is clamped against the bottom of the cup 15 by the bottom of another cup 19 which is nested within the outer cup 15. The washer 16 is in turn clamped against the rim of the inner cup 19 and is held in place by a small inturned flange 20 on the rim of the outer cup.

The band 12 is adapted to be placed under tension by the distension of the axially extending portion 18 of the packing in being fitted onto the shaft 14. The band bears against the outer surface of the axially extending portion 18 of the packing at 21; bears against the end surface of the axially extending portion at 22, and bears against the inside face of the washer 16 at 23. The band 12 is of considerably smaller cross-sectional area than the hollow interior of the casing and the outer periphery of the band is preferably spaced a substantial distance from the inner surface of the cylindrical wall of the casing 10, with the result that the band is subjected only to tension and is not placed under compression when in operation. The axially interlocking engagement of the band with the free edge of the packing protects such edge and also serves to maintain the band in snug but radially movable engagement with the washer 16, thereby forming an effective closure for the hollow interior of the casing.

In the modification which is shown in Fig. 3, the band 24, instead of being of the generally Z-shaped radial section shown in Figs. 1 and 2, is of plain rectangular cross section, but it is so proportioned with respect to the other parts of the assembly as to lap inwardly a little over the free edge 25 of the packing when the latter is distended, thereby resulting in a cross-sectional distortion of the band which causes the exposed portion 26 of the same to effectively interlock and seal with the packing and the adjacent end wall 27 of the casing. In this embodiment the metal casing for the seal is also of somewhat different construction. It consists of an outer cup 28, an inner cup 29 which is inversely nested within the cup 28, and a washer 30 which is clamped against the radially extending portion 31 of the packing by the rim of the cup 29.

In Fig. 4 a seal is shown which includes a metal spring ring 32. The ring 32, which is split at 33 in order to permit of contraction, has a conical inner surface 34 which bears against the conical cut end 35 of the axially extending portion 36 of the packing.

I claim:

1. In a seal, a hollow inwardly opening annular casing, a centrally apertured sheet leather packing having an outer portion which is secured against one end wall of the casing and an inner axially extending portion which terminates in proximity to the inner edge of the other end wall, and an imperforate elastic ring which is expanded about the axially extending portion of the packing in spaced relation to the outer wall of the casing and is so arranged as to form a closure for the gap between the edge of the axially extending portion of the packing and the edge of the adjacent end wall of the casing.

2. In a seal, a hollow inwardly opening annular casing, a centrally apertured sheet leather packing having a radially extending portion which is secured against one end wall of the casing and an axially extending portion which terminates in proximity to the inner edge of the other end wall, and an imperforate elastic ring which is expanded about the axially extending portion of the packing and engages with the edge face of the axially extending portion.

3. In a seal, a holder, a centrally apertured sheet packing mounted in the holder and characterized by an axially extending portion, and a resiliently expansible pressure member which surrounds the axially extending portion of the packing and also engages with the end of the axially extending portion, said pressure member being maintained against the end of the axially extending portion of the packing by a portion of the holder.

ALLEN F. GARDNER.